June 24, 1941.    F. C. EHRENREICH    2,247,226
HOT WATER RESERVOIR IN COFFEE URN
Filed Oct. 5, 1940

Inventor
Frank C. Ehrenreich.
by James R. McKnight
Attorney.

Patented June 24, 1941

2,247,226

UNITED STATES PATENT OFFICE 2,247,226

HOT WATER RESERVOIR IN COFFEE URN

Frank C. Ehrenreich, Chicago, Ill., assignor to Continental Coffee Company, Inc., Chicago, Ill., a corporation of Illinois Application October 5, 1940, Serial No. 359,845

1 Claim. (Cl. 53—3)

This invention relates to a hot water supply or reservoir in coffee urns.

Ordinarily restaurants do not have a separate boiler for providing hot water. In the event that hot water is needed for tea, hot chocolate or other beverage uses, it is usually withdrawn from the boiler of the coffee urn. This withdrawal deprives the urn of its required amount of water in proportion to the coffee used and results in bitter overly strong coffee. Sometimes when hot water is frequently withdrawn from the boiler of the coffee urn, it is necessary to replenish the supply of water in the boiler. When this is done the remaining hot water goes to the top of the boiler and the new cold water passes to the bottom. Since the withdrawal faucet is ordinarily at the bottom, water then withdrawn from the boiler will be cold water and not suitable for tea, chocolate or other hot water uses.

It is among the objects of my invention to solve the above problems by providing a hot water supply construction within the boiler of a coffee urn from which hot water may be withdrawn without diminishing the hot water supply for coffee use in the boiler itself. Hot water withdrawn from my additional separate hot water supply construction will not affect the required volume of hot water in the boiler, so that at all times coffee will be prepared which is consistent and has the right amount of water for the coffee used. In addition my hot water supply construction being positioned with its open top portion at the upper portion of the boiler will always receive and be filled with the hottest water, so that even when the boiler is partly replenished with cold water the remaining hot water rising to the top will fill the separate hot water supply reservoir. With my construction the likelihood of the withdrawal of cold water is substantially eliminated.

My invention also contemplates such other objects, advantages and capabilities as will later more fully appear and which are inherently possessed by my invention.

While I have shown in the accompanying drawing a preferred form of my invention, yet I desire it understood that the same is susceptible of modification and change without departing from the spirit of my invention.

Figure 1:
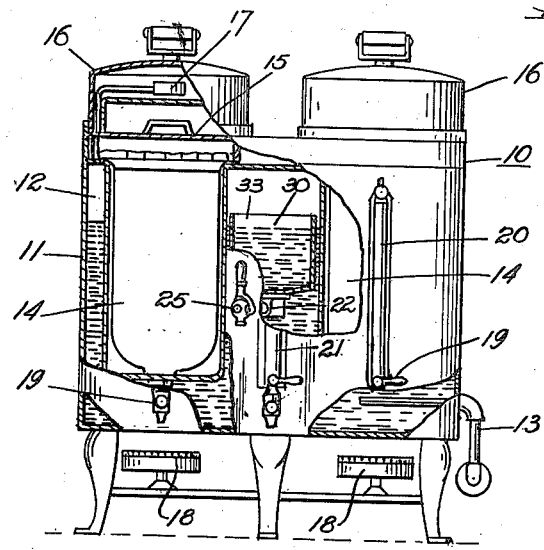
Figure 2:
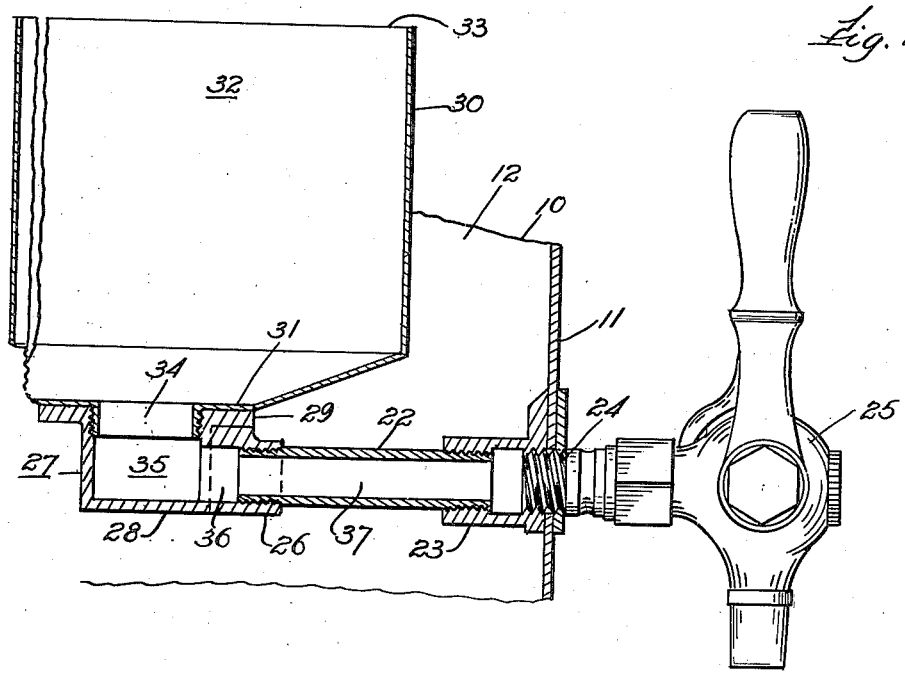

Referring to the drawing, Fig. 1 is a front elevational view partly broken away showing the location of my hot water reservoir, and Fig. 2 is an enlarged sectional view showing the details of my hot water reservoir.

For purposes of illustration I show an urn 10 having an outer casing 11. Water is provided for the hollow interior or boiler 12 by a suitable water inlet pipe 13 leading from a water source of supply. Spaced jars 14 are positioned within the boiler 12. Coffee makers 15 are positioned within the jars 14, closed by covers 16, and suitable spray members 17 provide hot water from the boiler 12 to the coffee makers 15. The water is heated by suitable burners 18. Faucets 19 are provided on the outside of the casing and are suitably connected for the withdrawal of coffee from the jars 14. Suitable coffee gauge 20 and a water gauge 21 are provided to be read from the exterior of the casing.

In combination with the foregoing structure, I provide a pipe 22 extending through and supported by the walls of casing 11 adjacent its middle portion. At its outer end pipe 22 has an enlarged portion 23 which is screw threaded to receive the screw threaded shank 24 of a faucet 25. Attached to the inner end of pipe 22 is the pipe extension 26 of support 27. Said support 27 has a rounded body portion 28 surrounded by an upper flange portion 29. A can or reservoir 30 has its bottom portion 31 supported on the upper flange portion 29 of support 27. The side walls 32 of can 30 extend upwardly within boiler 12 to its upper portion. The top 33 of can 30 is open.

In use water is supplied to boiler 12 through water inlet pipe 13 and the water is heated by burners 18. The hottest water at the upper portion of boiler 12 enters reservoir 30 through its open top 33 until the can is filled. When hot water is needed faucet 25 is opened and hot water passes from reservoir 30 down through opening 34 in the bottom 31 into the well 35 in body portion 28 in support 27 and thence through passageway 36 in pipe extension 26 and passageway 37 in pipe 22 and out through faucet 25. The withdrawal of this water from reservoir 30 does not diminish the supply of water in boiler 12.

If at any time water is added to hot water in boiler 12, the hot water will pass to the top of boiler 12 to refill reservoir 30. This insures the withdrawal of hot water from faucet 25.

Having thus described my invention, I claim:

In combination with a coffee urn having a casing, a boiler, coffee makers adapted to hold coffee and coffee holders within said casing, a pipe leading into said boiler for supplying water therefor, means for heating said boiler and the water therein, said boiler of such a size that the desired amount of heated water may contact the coffee in the coffee makers and pass as liquid coffee of consistent strength into the coffee holders, means manually operable on the exterior of the coffee urn for withdrawing hot liquid coffee of consistent strength from the coffee holders, a hot water reservoir comprising a hollow support attached to said casing and extending within said boiler, a reservoir supported on said support and extending upwardly to the upper portion of said boiler, and having an opening to receive hot water from said boiler before said water contacts said coffee makers, and without diminishing the supply of water for coffee of consistent strength, and a faucet communicating with said hollow support, and manually operable from the exterior of the urn for withdrawing hot water from said hot water reservoir without diminishing the water supply for the coffee makers and holders.

FRANK C. EHRENREICH.